US011707062B2

(12) United States Patent
Pathak et al.

(10) Patent No.: US 11,707,062 B2
(45) Date of Patent: Jul. 25, 2023

(54) FORMULATION OF STEARYL ALCOHOL

(71) Applicant: PRO FARM GROUP, INC., Davis, CA (US)

(72) Inventors: Pankaj Pathak, Davis, CA (US); Louis Boddy, Davis, CA (US)

(73) Assignee: Pro Farm Group, Inc., Davis, CA (US)

( * ) Notice: Subject to any disclaimer, the term of this patent is extended or adjusted under 35 U.S.C. 154(b) by 0 days.

(21) Appl. No.: 16/494,873

(22) PCT Filed: May 10, 2018

(86) PCT No.: PCT/US2018/032041
§ 371 (c)(1),
(2) Date: Sep. 17, 2019

(87) PCT Pub. No.: WO2018/209065
PCT Pub. Date: Nov. 15, 2018

(65) Prior Publication Data
US 2020/0100495 A1    Apr. 2, 2020

Related U.S. Application Data

(60) Provisional application No. 62/521,940, filed on Jun. 19, 2017, provisional application No. 62/505,446, filed on May 12, 2017.

(51) Int. Cl.
*A01N 3/00*    (2006.01)
*A01N 31/00*    (2006.01)
*A01P 21/00*    (2006.01)

(52) U.S. Cl.
CPC ....................... *A01N 3/00* (2013.01)

(58) Field of Classification Search
CPC .................. A01N 3/00; A01N 31/00
See application file for complete search history.

(56) References Cited

U.S. PATENT DOCUMENTS

| | | | |
|---|---|---|---|
| 6,489,269 B1 | 12/2002 | Hayashi et al. | |
| 6,849,576 B2 | 2/2005 | Suzuki et al. | |
| 6,884,759 B2 | 4/2005 | Hayashi et al. | |
| 7,585,814 B2 | 9/2009 | Hayashi et al. | |
| 7,718,571 B2 | 5/2010 | Nomura et al. | |
| 2002/0107147 A1 | 8/2002 | Hayashi et al. | |
| 2003/0216261 A1* | 11/2003 | Hayashi | C05G 5/20 504/353 |
| 2011/0237591 A1 | 9/2011 | Knieriem et al. | |

(Continued)

FOREIGN PATENT DOCUMENTS

AU    2018265271 B2    6/2020

OTHER PUBLICATIONS

Borregaard Lignotech's Dispersants for AgChem Formulations; www.lignotech.com/Industrial-Applications/Agriculture/Agricultural-Chemicals; Apr. 30, 2020; pp. 1-2.

(Continued)

*Primary Examiner* — Bijan Ahvazi
(74) *Attorney, Agent, or Firm* — Dentons Durham Jones Pinegar; Sarah W. Matthews

(57) ABSTRACT

The present invention includes a new formulation of a mono-alcohol having 12 to 19 carbon atoms or 20 to 30 carbon atoms, and its new methods of use in plants thereof.

18 Claims, 8 Drawing Sheets

(56) References Cited

U.S. PATENT DOCUMENTS

2013/0053244 A1* 2/2013 Devisetty .............. A01N 43/90
504/136
2015/0189885 A1 7/2015 Wikeley et al.

OTHER PUBLICATIONS

HCD-Antifoam OR-90 Technical Data Sheet; Momentive; Rev. Mar. 30, 2020; pp. 1-4.
Soprophor® Bsu Solvay; www.solvay.com/en/product/soprophor-bsu; Apr. 30, 2020; pp. 1-3.
International Preliminary Report and Written Opinion in PCT/US2018/032041 dated Nov. 12, 2019, pp. 1-8.
International Search Report and Written Opinion in PCT/US2018/032041 dated Sep. 27, 2018, pp. 1-12.
Extended European Search Report dated Jan. 19, 2021, pp. 1-6.
Neales et al.,; "Reduction of Plant Transpiration by Cetyl Alcohol"; Nature Bot. Gaz. Adv. in Genetics; Sep. 22, 1962; pp. 1221-1222 (XP055760097).
Alexieva, V. et al.; "The effect of drought and ultraviolet radiation on growth and stress markers in pea and wheat"; Plant, Cell and Environment (2001) 24, 1337-1344.
Antonakou, M. et al.; "Surround (Kaolin 95% W/W) WP Crop Protectant A New Broad Spectrum Crop Protectant Against Insects, Sunburn and Heat Stress on Many Crops"; pp. 1-8.
Antonia, L. et al.; "Quantification of pigments in tomato leaves using reflectance spectroscopy"; pp. 1-4.
Australia Examination Report in 2018265271 dated Mar. 6, 2020; pp. 1-3.
Basahi, J. et al.; "Effects of Enhanced UV-B Radiation and Drought Stress on Photosynthetic Performance of Lettuce (*Lactuca sativa* L. *Romaine*) Plants"; Annual Research & Review in Biology, 2014, 4(11): 1739-1756.
Du, B. et al.; "Physiological responses of date palm (*Phoenix dactylifera*) seedlings to acute ozone exposure at high temperature;" Environmental Pollution 242 (2018) 905-913.
Experts Report in PCT/2019/003234 dated Feb. 18, 2021, pp. 1-14.
Kimmerer, T. et al.; "Ethylene, Ethane, Acetaldehyde, and Ethanol Production By Plants Under Stress"; Plant Physiol. (1982) 69, 840-847.
Lakhssassi, N. et al.; "Stearoyl-Acyl Carrier Protein Desaturase Mutations Uncover an Impact of Stearic Acid in Leaf and Nodule Structure"; Plant Physiology, Jul. 2017, vol. 174, pp. 1531-1543.
Meszaros, I. et al.; "Effects of supplemental UV-B and drought stress on photosynthetic activity of sessile Oak (*Quercus petrel* L.)"; S3-306, pp. 1-4.
New Zealand Examination Report in 756761 dated Mar. 6, 2020; pp. 1-3.
Penn, D.J. et al., "Toxicity of Glyphosate Applied to Roots of Barley Seedlings"; New Phytol. (1982) 90, 51-55.
Salama, H. et al.; "Effect of ultraviolet radiation on chlorophyll, carotenoid, protein and proline contents of some annual desert plants"; Saudi Journal of Biological Sciences (2011) 18, 79-86.
Sangoi, L. et al., "Maize Susceptibility to Drought at Flowering: A New Approach to Overcome the Problem"; Ciencia Rural, Santa Maria, v. 28, n. 4, pp. 699-706, 1998.
Vu, C.V. et al.; Effects of UV-B Radiation (280-320 nm) on Photosynthetic Constituents and Processes in Expanding Leaves of Soybean (*Glycine Max* (L.) *Merr.*); Environmental and Experimental Botany, vol. 22, No. 5, pp. 465-473, 1982.
Zhang, X. et al.; "The Role of Leaf Pigment and Antioxidant Levels in UV-B Resistance of Dark- and Light-green Kentucky Bluegrass Cultivars"; J. Amer. Soc. Hort. Sci. 130(6):836-841, 2005.
Ziatev, Z. et al.; "Plant physiological responses to UV-B radiation"; Emir. J. Food Agric. 2012, 24(6): 481-501.

* cited by examiner

FORMULATION OF STEARYL ALCOHOL

CROSS-REFERENCE TO RELATED APPLICATIONS

This application claims priority to, and is the National Stage of International Application No. PCT/US2018/032041 filed on May 10, 2018 and claims the benefit under 35 U.S.C. § 119(e) of U.S. Provisional Application No. 62/505,446, filed May 12, 2017, and U.S. Provisional Application No. 62/521,940, filed Jun. 19, 2017. Both of which are hereby incorporated by reference in their entirety.

TECHNICAL FIELD OF THE INVENTION

The present invention relates in general to the field of new formulation of a mono-alcohol having (a) 12 to 19 carbon atoms or (b) 20 to 30 carbon atoms, and its new method of uses in plants thereof.

STATEMENT OF FEDERALLY FUNDED RESEARCH

None

INCORPORATION-BY-REFERENCE OF MATERIALS FILED ON COMPACT DISC none

BACKGROUND OF THE INVENTION

Without limiting the scope of the invention, its background is described in connection with a mono-alcohol having (a) 12 to 19 carbon atoms or (b) 20 to 30 carbon atoms, and its method of use in plants.

The composition of stearyl alcohol and its method of use in plant growth promotion are known in the art. See, for example, U.S. Pat. Nos. 6,489,269 B1, 6,884,759 B2, 7,585,814 B2, and 7,718,571 B2, all of which are incorporated in reference in their entirety. More particularly, the various structures of stearyl alcohol, its methods of use are incorporated in reference.

Although various structures and formulations of stearyl alcohol exist in the art, they are often unstable and have little to no efficacy. Therefore, there is a need for a stable stearyl alcohol formulation.

SUMMARY OF THE INVENTION

The present disclosure contemplates on a new formulation of stearyl alcohol that has surprising efficacy.

In one aspect, the present disclosure relates to a composition comprising (a) about 10% of a mono-alcohol having 12 to 24 carbon atoms, (b) about 0.1% of Antifoam OR-90, (c) about 2% of Soprophor BSU, (d) about 5% of Propylene Glycol, (d) about 0.5% of Potassium sorbate, (e) about 0.5% of Sodium benzoate, (f) about 0.1% of Xanthan gum, and (g) about 1% of Borresperse 3A. This is called embodiment 1.

In another aspect, a composition comprising a mono-alcohol having (a) 12 to 19 carbon atoms, (b) 20 to 30 carbon atoms, (c) about 0.1% of Antifoam OR-90, (d) about 2% of Soprophor BSU, (e) about 5% of Propylene Glycol, (f) about 0.5% of Potassium sorbate, (g) about 0.5% of Sodium benzoate, (h) about 0.1% of Xanthan gum, and (i) about 1% of Borresperse 3A is contemplated. This is embodiment 2.

Yet in another aspect, the composition of embodiments 1-2, further comprising a sun blocking reagent, fertilizer, insecticide, or fungicide. This is embodiment 3.

In an aspect, a method to reduce sun burn effects on a plant and/or fruit comprising applying an effective amount of the embodiments 1-3, wherein said plant and/or fruit has reduced sun burn effect is contemplated.

In another aspect, the present disclosure relates to a method to increase water retention in a plant and/or fruit comprising applying an effective amount of the composition of embodiments 1-3, wherein said plant and/or fruit has increased water retention.

In an aspect, various advantages of the new formulations of embodiment 1-3 are contemplated, these include, but are not limited to the fact that the new formulation can decreases the proportion of light transmitted through the plant cuticle, can lead to reduced plant leaf temperatures, can decrease transpiration around periods of heat stress, can increase plant yield, and/or can protects plants/fruits from solar radiation damage.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
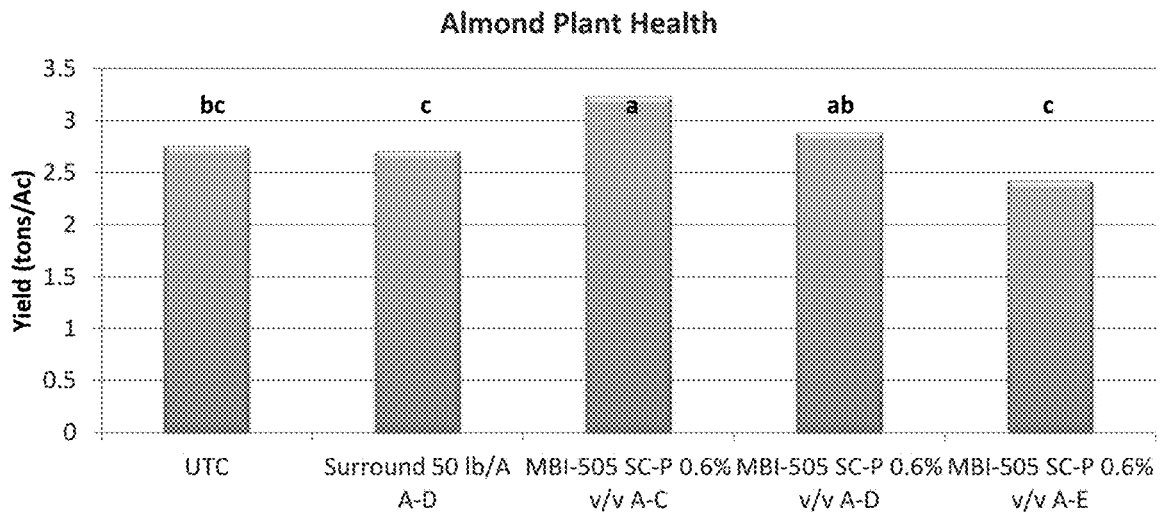
FIG. 1 denotes almond total yield versus different concentration of the new formulation ("SC-P"). The SC-P applied 3 times resulted in a statistically higher yield compared to all other treatments & to untreated control ("UTC"). From these results, it appears that less is better, & that earlier timings have a greater benefit in almond.
Figure 2:
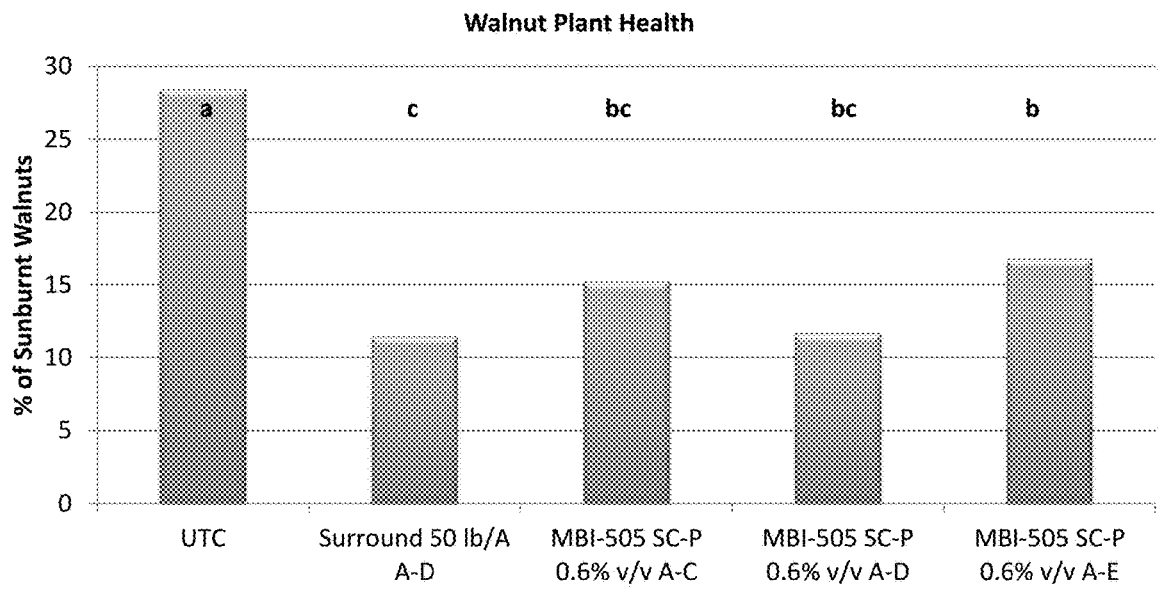
FIG. 2 denotes % of sunburnt walnut versus SC-P formulation concentration. All products reduced % sunburnt walnuts statistically superior to the UTC. SC-P performed statistically similarly to the standard.
Figure 3:
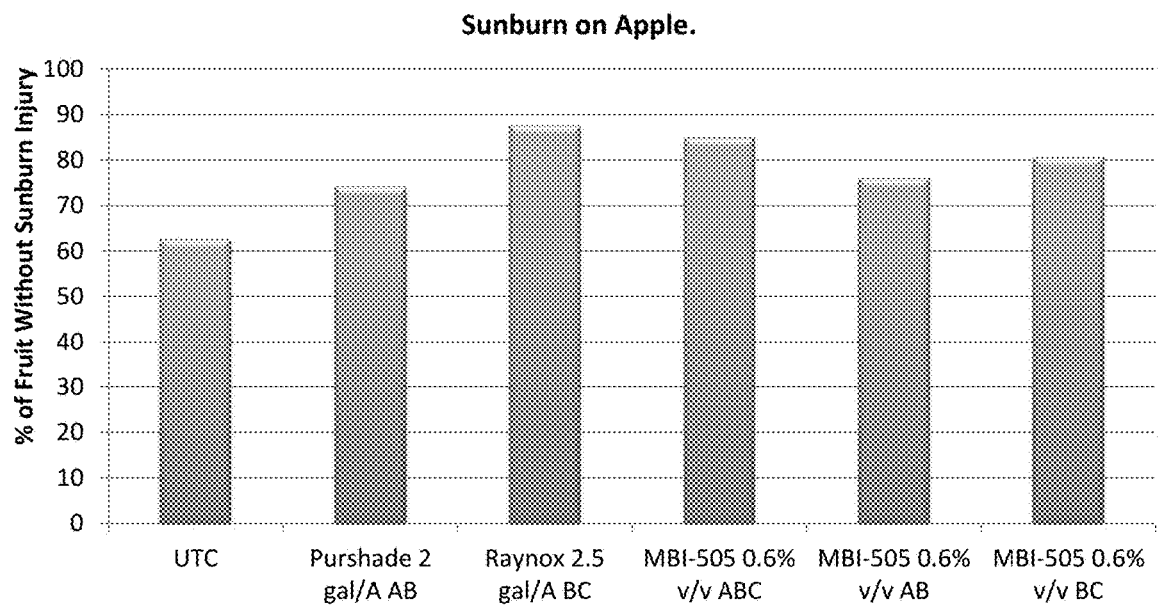
FIG. 3 denote the number of apple without sunburn injury. The % of fruit without sunburn injury was numerically highest in the plots treated with SC-P 0.6% v/v & the Raynox standard.
Figure 4:
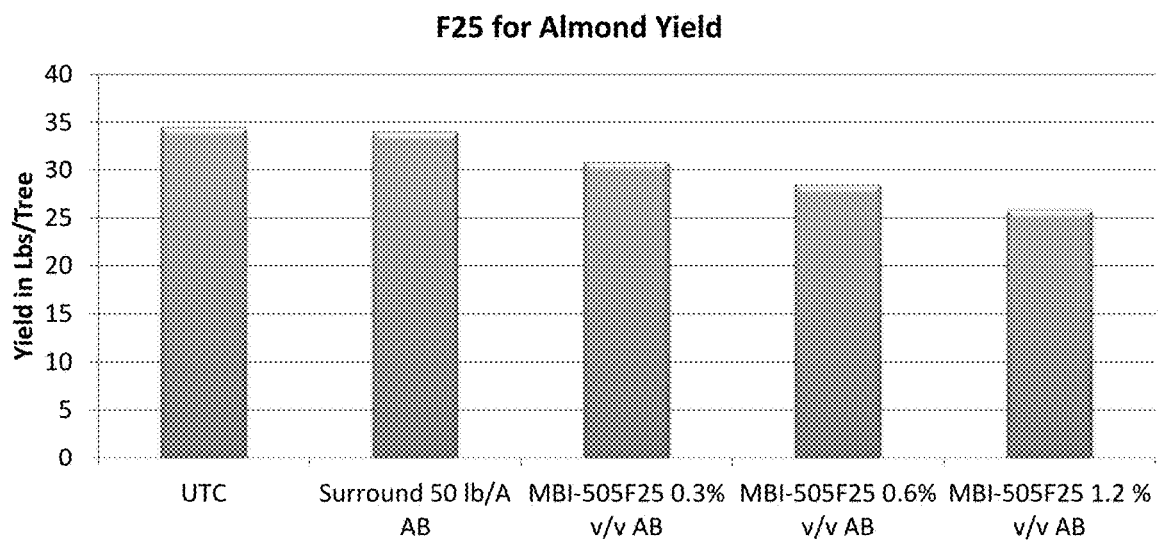
FIG. 4 denotes almond yield using the F25 formulation. Treatment timings: full bloom & 2 weeks post-full bloom. Foliar, 100 gallons per acre. Yield assessments measured as total nut weight in lb/tree; data collected 8/14 Large-plot, non-replicated study; no statistical analysis. Negligible differences observed between UTC & all treatments for color, sunburn, vigor, flush, yield, & quality ratings. Treatments included 1 pt Regulaid/100 Gal.
Figure 5:
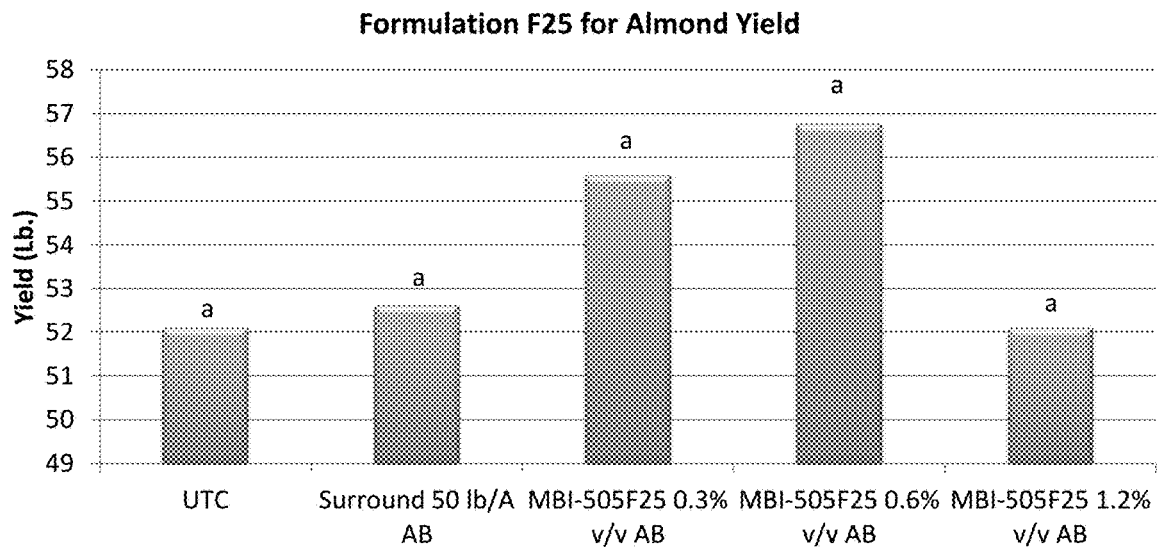
FIG. 5 denotes another almond yield trial using the F25 formulation. There was no statistical separation of either yield or marketability data for UTC, standard, or any MBI treatment at either P=0.5 or P=0.10. There were no visible differences noted in plant growth, foliage color, size, or longevity, fruit kernel color or size.
Figure 6:
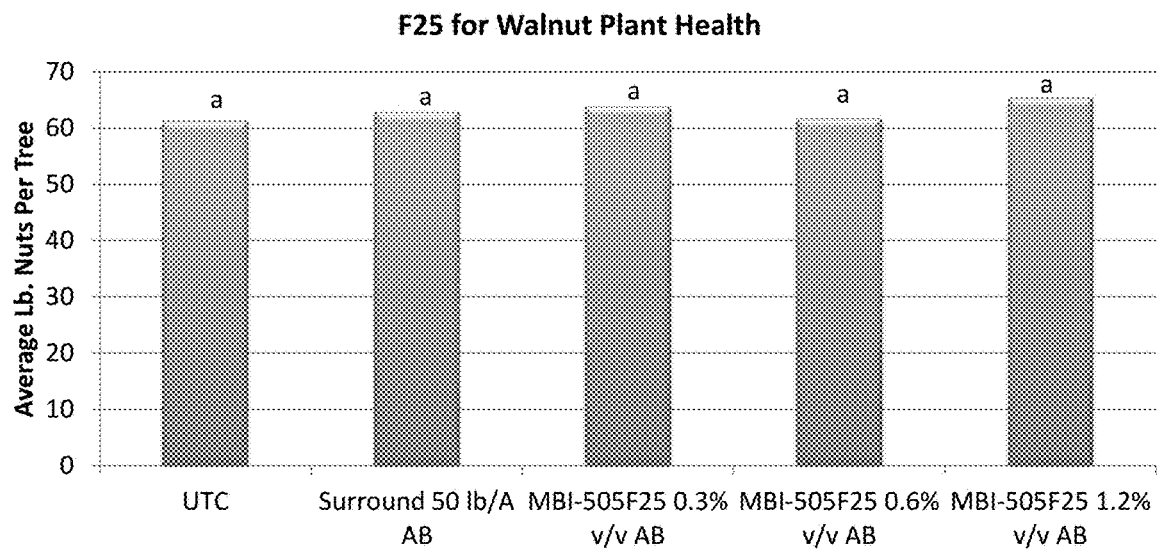
FIG. 6 denotes walnut plant health using the F25 formulation. No statistically significant differences in yield, % marketable & unmarketable nuts, incidence of lobe shrivel, or incidence & severity of sunburn were observed between UTC, standard or F25 materials for any assessment date.
Figure 7:
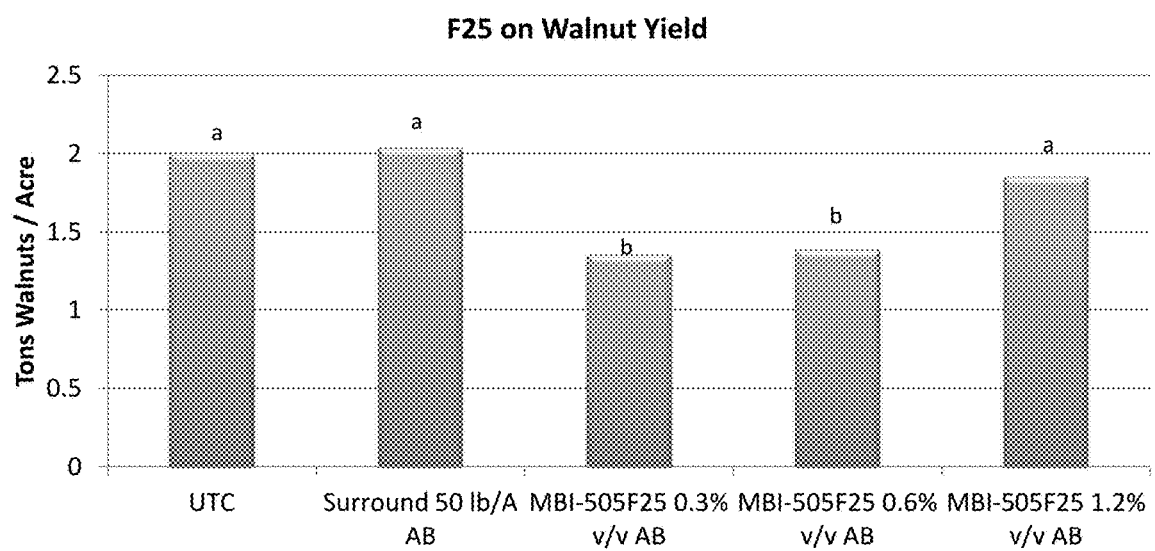
FIG. 7 denotes walnut yield using the F25 formulation. UTC, standard, & high rate of MBI-505 were statistically similar for Tons nuts/Acre. No statistically significant differences observed between UTC & all treatments for sunburn, nut meat coloration, nut crackout, average nut weight, & average nut size during any assessment.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein, "SC-P" formulation include (a) at least about 10% stearyl alcohol, (b) at least about 0.1% of Antifoam OR-90, (c) at least about 2% of Soprophor BSU, (d) at least about 5% of Propylene Glycol, (e) at least about 0.5% of Potassium sorbate, (f) at least about 0.5% of Sodium benzoate, (g) at least about 0.1% of Xanthan gum, and (h) at least about 1% of Borresperse 3A. Unless otherwise indicated, all examples and figures were conducted using the SC-P formulation.

As used herein, "F25" formulation include (a) at least about 10% stearyl alcohol, (b) at least about 30% Isopropyl myristate, (c) at least about 5% Tween 20, (d) at least about 2% Span80, (e) at least about 18% 1-Hexanol, and (d) at least about 35% water.

As used herein, "MBI-505" stands for a composition having stearyl alcohol as the active ingredient.

As used herein, "about" follow by a number means plus or minus 20% of such number. For example, about 10% stearyl alcohol means from 8-12% of stearyl alcohol.

In one embodiment, the active ingredient of the present disclose include the following formula (1):

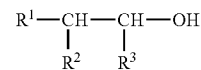

wherein R1 represents a C10 to C22 hydrocarbon group, R2 represents a hydrogen atom, a hydroxyl group or a C1 to C24 hydrocarbon group, and R3 represents a hydrogen atom or a C1 to C24 hydrocarbon group.

In the general formula (1), the hydrocarbon groups represented by R1, R2 and R3 may be respectively saturated or unsaturated groups, preferably saturated groups, and may be linear, branched or cyclic chains, preferably linear or branched chains, particularly preferably linear chains. The number of total carbons in the hydrocarbon group can be either an odd number or an even number, preferably an even number.

The number of total carbons in R1, R2 or R3 is preferably 50 or less, more preferably 12 to 48, still more preferably 16 to 44. In the general formula (1), the number of carbons in R 1 is preferably 14 to 22, more preferably 14 to 20, still more preferably 14 to 18. The number of total carbons in the compound represented by the general formula (1) is preferably 12 to 48, more preferably 16 to 28, still more preferably 16 to 24. The compound is more preferably a compound containing 12 to 24 carbons in total and having one hydroxyl group, still more preferably a compound containing 16 to 22 carbons in total and having one hydroxyl group.

Mode of Action

In one embodiment, the general formula (1), which is also known as stearyl alcohol, is a plant antitranspirant and sun damage protectant that can be extracted from coconut palms. Stearyl alcohol is a natural precursor to certain leaf cuticle. The cuticle is a hydrophobic multi-layered structure that resides on the outer surface of aerial plant epidermal cells. Plants employ leaf cuticles to limit water loss from non-stomatal plant surfaces and to protect aerial plant organs from pathogens, herbivores, mechanical damage or excess radiation culminating in damage to cell membranes and chlorophyll. Cuticle waxes protect against photoinhibition of photosynthesis by increasing reflectance of light in the visible and infrared spectra; this leads to reduced transpiration rates and consequently increased leaf water-use efficiency. In the presence of a fully developed cuticle and under normal conditions, most transpiration is conducted through stomatal pores which are typically concentrated on the underside of the leaf. In times of water stress the cuticle structure may be modified to further reduce water loss from the epidermis. As an exception to this, cuticular transpiration tends to be higher in young ripening fruit. Transpiration dissipates excess heat through evaporative cooling; the hotter the leaf temperature, the more water must be expended for this purpose, which can jeopardize long-term crop vitality in areas prone to soil water stress. Photosynthesis demands that some amount of water loss inevitably occurs, in order for carbon dioxide to enter the leaf via open stomata; however under warmer temperatures the saturation water vapor concentration of ambient air increases, forcing leaf cells to transpire more water than necessary in order to equilibrate. The warmer the air temperature, the longer stomata must remain open, and the greater the amount of water that is lost from the leaf. In contrast, leaves with lower internal temperatures do not need to transpire as much as those with higher temperatures and can thus conserve more of their limited supply of water for allocation to photosynthesis, and thereby to biomass accumulation. Leaf expansion is particularly sensitive to minor internal water deficits; thus avoiding such deficits allows for the production of larger leaves which in turn redounds to greater production of photosynthates for harvestable plant components. In addition to moderating transpiration, reducing internal temperature can bring leaves closer to optimum temperature levels for photosynthesis. This is because high temperatures can adversely affect various processes related to photosynthesis, including activation of the key enzyme rubisco, membrane-bound phases of the electron transport chain, and energy allocated to photorespiration. Maintaining temperatures below 35° C. for preserving cuticle integrity and leaves that exceed this threshold are much more prone to cuticular transpiration. Sunburn can occur when incoming light radiation surpasses the capacity of the xanthophyll cycle to dissipate excess light energy. Radiation from wavelengths outside the photosynthetic range, such as UV-B (315-280 nm), can be particularly harmful to plant tissue and growth. UV-B radiation is the highest energy component of the daylight spectrum and has been shown to cause reductions in plant height and leaf area; leaf curling, bronzing, glazing or chlorosis; delayed flowering and fruit ripening; degradation of photosynthetic proteins; destruction of chlorophyll and carotenoids; reduction of activity of the key photosynthetic enzyme rubisco; and generation of reactive oxygen species that damage lipids, proteins and DNA; increases in UV-B radiation have also been shown to increase cuticle thickness, indicating increased plant resource allocation to protective structures rather than to harvestable material. Further, UV-B radiation is thought to be a driving cause of sunburn browning damage to fruits such as apples when ambient temperatures exceed 35° C. The epidermis of herbaceous dicots is thought to be especially ineffective at screening UV-B radiation. UV-B radiation is particularly harmful to older leaves and to plants growing at low latitudes and high altitudes. The adverse effects of UV-B can be exacerbated in the presence of other environmental stressors like water deficit. The relationship between heat and UV-B is unclear but evidence that cuticle structures are weakened under high temperatures suggest increased plant sensitivity when these two stressors are combined.

Therefore, in certain embodiment, stearyl alcohol enhances the action of the plant cuticle by decreasing the proportion of light transmitted into the leaf or other aerial plant organ, particularly in the UV-B range; reduces in incoming light radiation lowers leaf temperatures; decreases temperatures lead to reduced water loss from transpiration; thereby allowing plants treated to use conserved water for photosynthesis, increases water use efficiency, biomass accumulation and yields. Application of stearyl alcohol also results in reduced damage from excessive exposure to UV-B radiation. In other words, by reflecting excess solar radiation, stearyl alcohol lowers leaf temperatures to reduce the effects of heat and of water deficits, and protects plant surfaces from the deleterious effects of UV-B.

Formulations

The present disclosure also discloses at least two formulations of stearyl alcohol. One is called F25 and the other is called SC-P. As shown from the present examples and/or figures, the SC-P exhibits superior and surprising strong efficacy to improve sun burn effects and/or water retention while the concentration of the stearyl alcohol remains constant. This was surprising and unexpected because the change in formulation should only change the solubility of the stearyl alcohol. However, the present disclosure shows that when solubility is similar, the efficacy increased unexpectedly while the active ingredient stays constant.

The fruit/vegetable as the subject of the present disclosure includes, but are not limited to: grape, cucumber, pumpkin, watermelon, melon, potato, tomato, eggplant, green pepper, strawberry, okra, string bean, broad bean, pea, soybean, corn, grapes, citrus, almond, walnut or apple. In another embodiment the plants and/or fruits can be cucumber, pumpkin, watermelon, melon, tomato, eggplant, green pepper, strawberry, okra, string bean, broad bean, pea, green soybean or corn; leaf vegetables such as Chinese cabbage, greens to be pickled, pakchoi, cabbage, cauliflower, broccoli, Brussels sprouts, onion, Welsh onion, garlic, shallot, leek, asparagus, lettuce, leaf lettuce, celery, spinach, garland chrysanthemum, parsley, wild chervil, Japanese parsley, udo, Japanese ginger, butterbur or beef-steak plant; and root vegetables such as radish, turnip, burdock, carrot, potato, taro, sweet potato, yam, ginger or lotus root. In addition, the plant-activating agent can also be used for rice plants, wheat plants, and flowering plants.

EXAMPLES

Example 1

Stearyl alcohol decreases the proportion of light transmitted through the cuticle.

To test the hypothesis that stearyl alcohol reduces transmission of light radiation, particularly within the UV-B spectrum, percent (%) transmittance were measured using a spectrophotometer. stearyl alcohol was diluted to 1/100th of the field application rate (6 mL/L active ingredient) for both visible and non-visible UV light spectra. Visible light spectral analysis was conducted using a 96 well plate while UV transparent cuvettes and 96 well plates were utilized to analyze the percent light transmittance at the UV spectrum. For all spectrophotometer light transmittance screenings, both a water reference and plate blank were used to calibrate the ratio of light energy transmitted through the formulation samples to the energy transmitted through the reference blank. Treatments were replicated three times.

Figure 8:
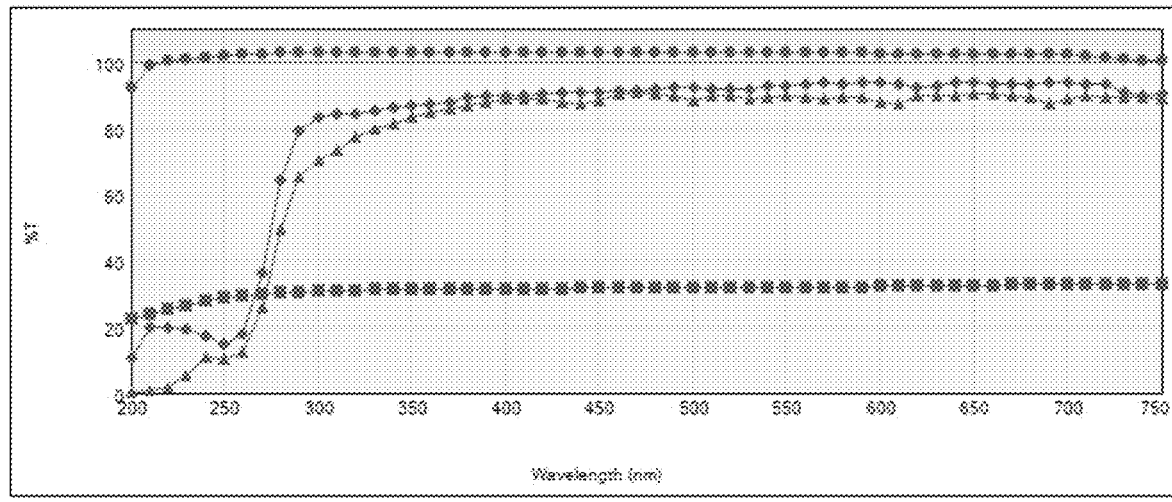
FIG. 8 denotes percent light transmission (% T) of wavelengths between 200 and 750 nm. UV-B radiation occurs at 280-315 nm (dashed green lines), while photosynthetically active radiation occurs between 400-700 nm (solid green lines). The rows of symbols correspond to 12 mL/L concentrations of formulated stearyl alcohol (triangles) and two alternate formulations (squares, diamonds). Water (circles) results in 100% light transmittance.

Across all wavelengths, stearyl alcohol reduced the amount of transmitted radiation (FIG. 8). Depending on the concentration of material applied, stearyl alcohol resulted in 20-50% reductions of transmitted UV-B radiation, and 10-15% reductions of light in the photosynthetically active radiation spectrum (400-700 nm). Thus stearyl alcohol blocks a greater proportion of harmful UV-B radiation compared with photosynthetically active radiation.

Example 2

Stearyl alcohol leads to reduced leaf temperatures.

To test the hypothesis that stearyl alcohol reduces internal leaf temperatures while not adversely affecting photosynthesis, stearyl alcohol was applied to eight attached soybean leaves selected from plants growing in a field. The leaves were spaced in blocks so that two leaves could be compared to each other as control/treatment pairs. The leaves were placed in fishing line, wood and metal holders that restrained the leaves in an exposed and horizontal orientation (to prevent leaf orientation changes affecting the leaf energy balance and temperature). Leaf temperature was measured with an IR thermometer three times before and six times after application of a 1% v/v DI water solution of stearyl alcohol to the upper leaf surface, applied using a household spray bottle. Full coverage of the leaf surface was achieved and excess water shaken off. Leaves were dry within half an hour. Measurements occurred from 11:00 AM to 3:15 PM and, of the nine measurement intervals, gas exchange measurements were made on four occasions (one prior and three after compound application) using a LICOR 6400XT. Measurement conditions were standard: 400 ppm $CO_2$, 2000 mol $m^{-2}$ $s^{-1}$ PAR (90% Red and 10% blue).

Figure 9:
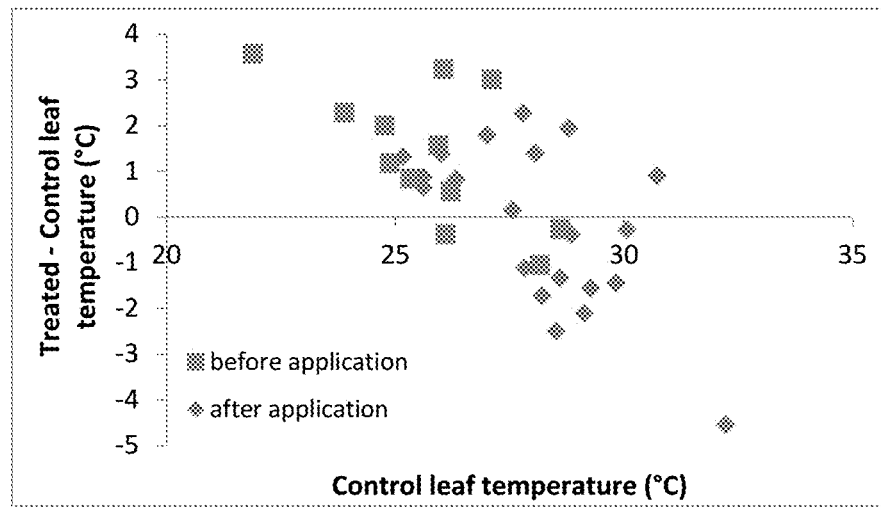
FIG. 9 denotes a comparison of the temperature depression caused by stearyl alcohol application to leaves. Points represent temperatures measured at 9 time intervals on four pairs of leaves.
Figure 10:
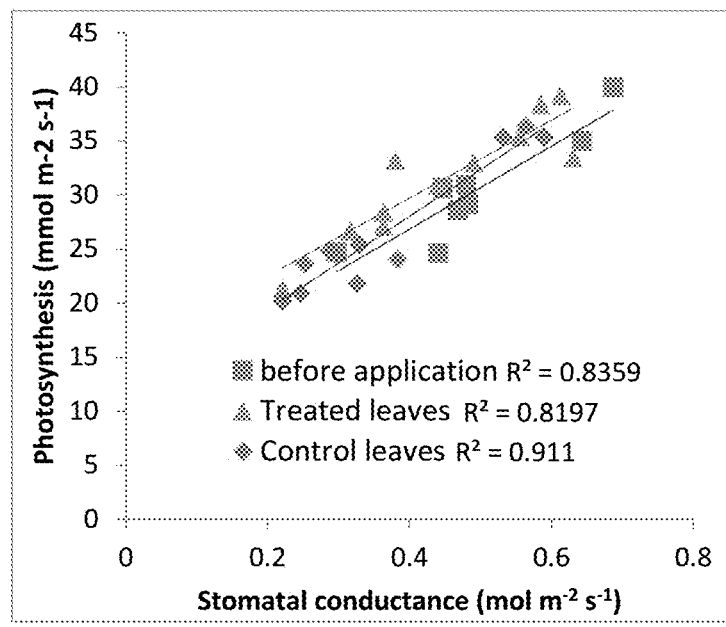
FIG. 10 denotes a comparison of photosynthetic capacity of treated leaves, control leaves and leaves prior to stearyl alcohol application. Photosynthetic capacity variation is interpreted as a treatment having higher/lower photosynthesis values than the control for the same stomatal conductance FIG. 11 denotes mean transpiration rates of tomato plants treated with stearyl alcohol at 72 hours after application. Bars represent standard errors.

Treated leaves had higher leaf temperatures than control leaves prior to treatment, but similar values post treatment (FIG. 9). The apparent depression in leaf temperatures after application of stearyl alcohol was 1.5 degree C. (SE±0.31), and was significant (P-value<0.02; paired t-test using four replicates calculated as the average of each leaf measurement on a leaf before or after the treatment). This supports the hypothesis that stearyl alcohol reflects heat. Photosynthetic rates were similar between all treatments, once variation in stomatal conductance was accounted for (FIG. 10), with the treated leaves being marginally higher than the controls. A lack of photosynthetic effect also suggests that the abaxial stomata are not occluded by the compound. Thus the compound should have no negative effect on radiation use efficiency or yield at the concentration used here.

Example 3

Stearyl alcohol decreases transpiration around periods of heat stress.

A controlled lab bioassay was run to evaluate the ability of stearyl alcohol to decrease transpiration of tomato plants under moderate heat stress. stearyl alcohol was applied at a 6 mL/L concentration in water to five tomato plants at the 6-8 leaf stage growing in 8.9 cm square pots, using a research track sprayer. Sombrero, a commercially available calcium carbonate plant sunscreen product, was applied as a positive control and deionized water as a negative control. The application rate was equivalent to 150 liters of diluted product per acre. After sealing pots with plastic bags to prevent water loss through evaporation from the soil surface and measuring total pot and plant weight, the plants were placed in randomized complete blocks in a growth chamber set to 26° C. with 50% relative humidity, x 3000 μW/cm2 illumination for 14 hours per day. Sealed pots and plants were again weighed at 24, 48 and 72 hours after application. Differences in weight were attributed to water loss through transpiration. Plant mass was then plotted against time, and the slope of the linear regression was taken to be the rate of water loss in Average surface area of the leaves (cm2) was calculated using a digital leaf area scanner. Mean transpiration rate was then calculated as: Rate=Water Loss Rate (μg/sec)/Total Leaf Area (cm2).

Figure 11:
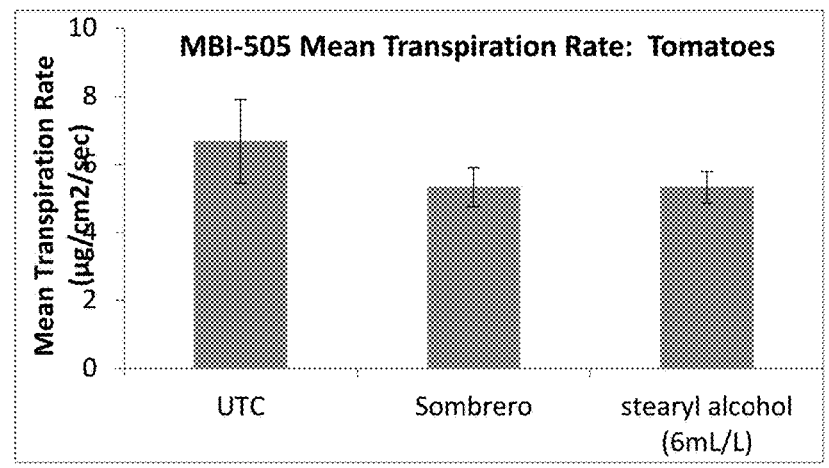

The mean transpiration rate of tomatoes (FIG. 11) was greatest in the untreated control replicates (6.68 μg/cm2/sec), while stearyl alcohol (5.33 μg/cm2/sec) and Sombrero (5.34 μg/cm2/sec) achieved comparable reductions in transpiration of about 20%. Thus leaf transpiration was shown to decrease with application of stearyl alcohol in a relatively short span of time. These reductions in transpiration were accompanied by average reductions in leaf temperature of 1.08 (±1.13) ° C. for Sombrero and 1.50 (±0.35) ° C. for stearyl alcohol. Thus a correlation is shown between lower temperatures and reduced transpiration after application of stearyl alcohol.

Example 4

Application of stearyl alcohol can increase yields.

Figure 12:
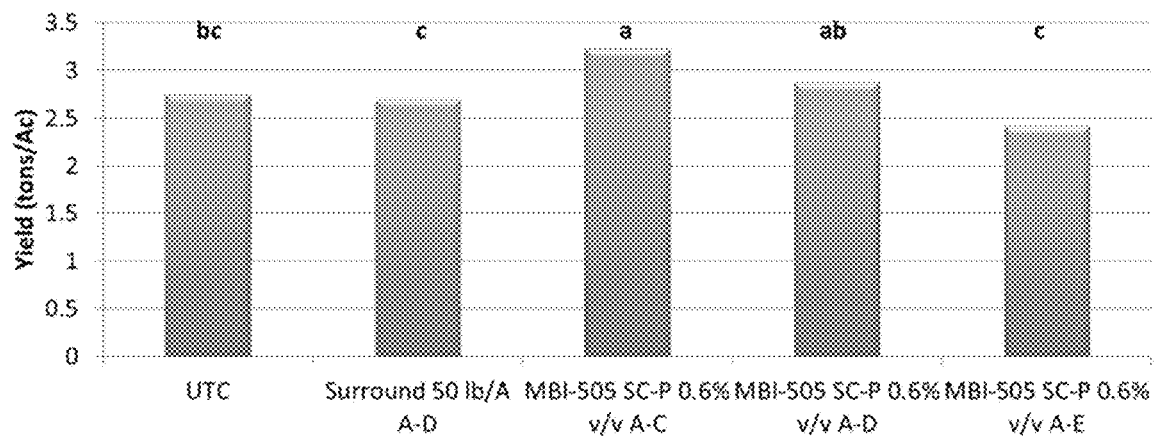
FIG. 12 denotes increase in almond yields after treatment with three applications of stearyl alcohol. Applications were made at full bloom (A), 14 days after full bloom (B), June drop (C), 14 days after June drop (D), and hull split (E). Experiment-wide means separations were conducted at 90% confidence using a Fisher LSD.

The potential of stearyl alcohol to increase yields was observed in an almond orchard field trial conducted. Stearyl alcohol was applied at a rate of 6 mL/L in a 379 liter (100 gallon) per acre tank solution with rates in volume of product/volume of carrier volume. Surround, a kaolin clay product, was applied as a positive control across three application timings, according to the label rate of 50 lbs per acre. Applications were made on three to five occasions: at full bloom, 14 days after full bloom, June drop, 14 days after June drop, and hull split. Treatments were applied with an airblast sprayer and replicated on three plots. Almonds were harvested. Yields for trees treated three times with 6 ml/L applications of stearyl alcohol (3.2 tons/A) were around 15% higher than for those treated with Surround (2.7 tons/A) or left untreated (2.8 tons/A) (FIG. 12). Thus, when applied at the appropriate frequency, yield increases may be obtained with stearyl alcohol. Pre-harvest field assessments on February 27, March 23, May 17, June 26, August 21 and August 27 checked and confirmed the crop safety of stearyl alcohol.

Example 5

Stearyl alcohol protects fruit from solar radiation damage.

Figure 13:
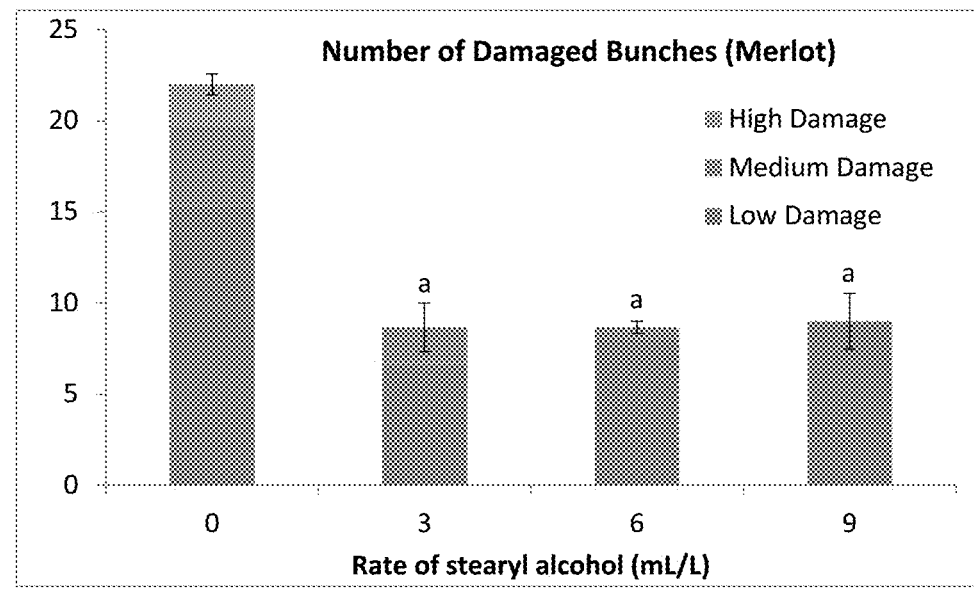
FIG. 13 denotes number of sun-damaged bunches of Merlot grape. Bars represent standard error for total number of damaged bunches. Letters are the same for each category of damage and represent significant differences according to a Tukey test for separation of means with α=0.05.
Figure 14:
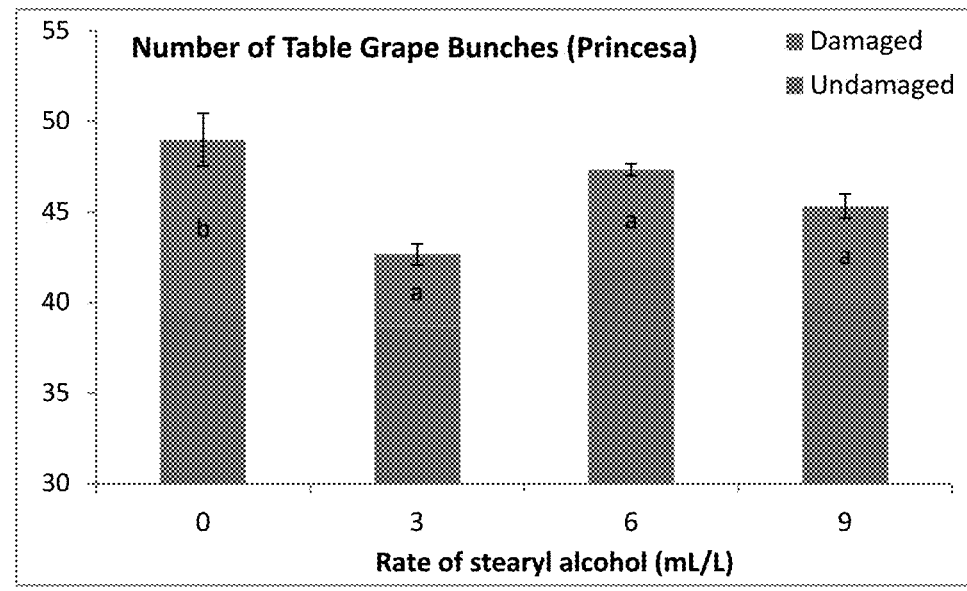
FIG. 14 denotes number of sun-damaged bunches of Princesa table grape. Bars represent standard error for number of damaged bunches. Letters represent significant differences in number of damaged bunches according to a Tukey test for separation of means with α=0.05.

To evaluate for protection from excess or harmful solar radiation, stearyl alcohol was applied by Duarte and Associates in established Chilean vineyards planted with wine (Merlot) and table (Princess) grape varieties. Plants were treated in 2014 with 3, 6 or 9 mL/L in 100 L of water when berries reached 11 mm in diameter and at two week intervals over the subsequent six weeks. Five contiguous vines were sprayed per treatment; treatments were replicated 3 times and arranged in a random complete block design. At harvest, bunches were counted per plant, yields assessed, sugar content measured and solar radiation damage rated. Plants treated with stearyl alcohol produced fewer damaged bunches, in both wine (FIG. 13) and table (FIG. 14) grape varieties. Reduced damage would appear to suggest that excess UVB rays are being blocked and that under certain conditions stearyl alcohol might therefore be applied to guard against sunburn or other forms of damage from excess solar radiation

Example 6

Unexpected phytotoxicity of different stearyl alcohol formulations.

A series of prototype stearyl alcohol formulations were evaluated for crop safety, including F25. In field and other outdoor experiments F25 was frequently associated with varying levels of phytotoxic symptoms, in part depending on the species of crop tested and the rate of application. To avoid risking crop health, a set of alternate formulation prototypes was developed. Table 1 summarizes the composition of each prototype, including F25.

TABLE 1

| Composition | % w/w |
|---|---|
| ME | |
| DI Water | 85.65 |
| Gelatin Type A | 1 |
| Gum Arabic | 1 |
| Stearyl Alcohol | 10 |
| Glutaraldehyde, 25% | 0.2 |
| Borresperse 3A | 1 |
| Potassium Sorbate | 0.5 |
| Sodium Benzoate | 0.5 |
| Xanthan Gum | 0.05 |
| Antifoam OR-90 | 0.1 |
| Total | 100 |
| SC-P | |
| DI Water | 77.8 |
| Soprophor 3D33 | 3 |
| Soprophor BSU | 2 |
| Stearyl Alcohol | 10 |
| Propylene Glycol | 5 |
| Borresperse 3A | 1 |
| Potassium Sorbate | 0.5 |
| Sodium Benzoate | 0.5 |
| Xanthan Gum | 0.1 |
| Antifoam OR-90 | 0.1 |
| Total | 100 |
| SC-A | |
| DI Water | 39 |
| Tersperse 4894 | 2 |
| Tersperse 2700 | 4 |
| Stearyl Alcohol | 35 |
| Propylene Glycol | 10 |
| 1% Xanthan Gum Premix | 10 |
| Total | 100 |
| F25 | |
| DI Water | 36 |
| Hexanol | 18 |
| Isopropyl Myristate | 30 |
| Stearyl Alcohol | 10 |
| Polysorbate 20 | 5 |
| Sorbitan monooleate 80 | 1 |
| Total | 100 |

Prototypes were first tested on corn and subsequently on flowers. Plants were grown in a greenhouse and were about 2 weeks old at the time of testing, reaching the 4-5 leaf stage by 7 days after the first treatment. Plants were treated on January 26 and again on February 1, evaluations were made 7 days after the first treatment. On the day of treatment, 100 ml aqueous solutions were prepared for concentrations of 6, 12 and 18 ml/L or 0.6, 1.2 and 1.8% v/v of each prototype formulation. Solutions were delivered to plants at a volume of 40 GPA using a research track sprayer fitted with an 8002 nozzle. Deionized water was applied as a negative control. There were three replicates per treatment. Plants were transferred back to the greenhouse after treatment.

Figure 15:
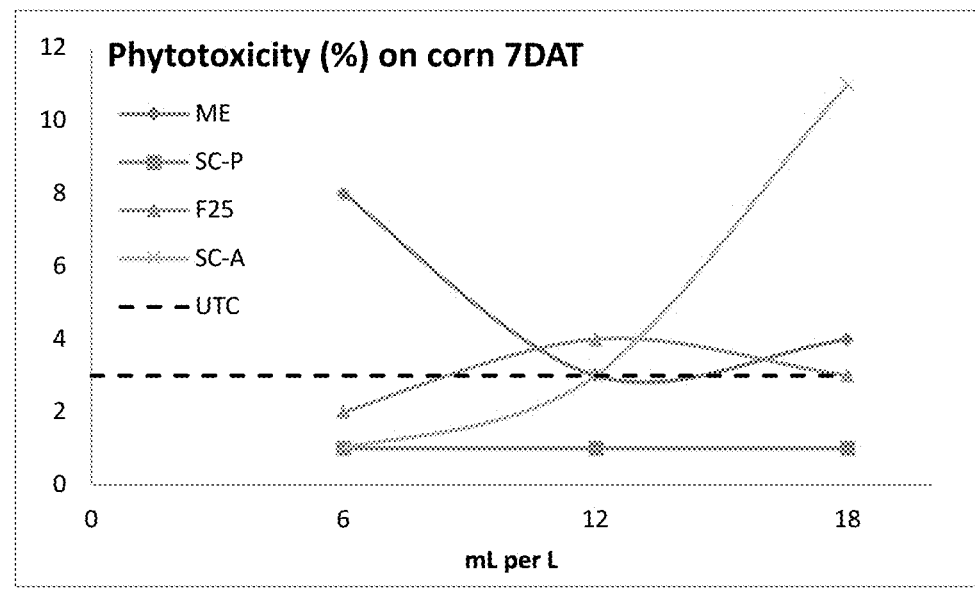
FIG. 15 denotes phytotoxicity of prototype stearyl alcohol formulations on corn. The dotted black line represents the severity of phytotoxicity (desiccated leaf tips) observed in the untreated control.

Phytotoxicity was evaluated as percent damage, with 100% equaling complete plant death. The symptoms observed in corn were burned (desiccated or necrotic) leaf tips. As burned tips are, to some degree, a common phenomenon in corn, some limited baseline damage was also detected in the untreated control plants. However, certain treatments greatly increased observed phytotoxicity, with the burning extending several inches beyond the extreme tip of the leaf. In the most damaged leaves, crinkling or stunted unfolding of the leaf was observed below the burned zone. The most phytotoxic prototype formulations were SC-A and ME. In contrast, formulation SC-P showed fewer symptoms, and thus appeared healthier, than the untreated control. See FIG. 15 for details. Again, the fact that different formulations of stearyl alcohol exhibited different phytotoxicity profile was surprising and unexpected since the active ingredient concentration stayed the same.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A composition consisting essentially of:
   (a) about 10% of a mono-alcohol having 12 to 24 carbon atoms,
   (b) about 0.1% of silicone,
   (c) about 3% of tristyrylphenol ethoxylate,
   (d) about 2% of tristyrylphenol ethoxylate nonionic emulsifier,
   (e) about 5% of propylene glycol,
   (f) about 0.5% of potassium sorbate,
   (g) about 0.5% of sodium benzoate,
   (h) about 0.1% of xanthan gum, and
   (i) about 1% of sodium lignosulphonate,
   wherein the percentages above are based on the total weight of composition.

2. The composition of claim 1, further comprising a sun blocking reagent.

3. The composition of claim 1, wherein the mono alcohol has 13, 14, 15, 16, 17, 18, 19, 20, 21, 22, 23, or 24 carbon atoms.

4. A method to reduce sun burn effects on a plant and/or fruit comprising applying the composition of claim 1.

5. The method of claim 4, wherein said plant and/or fruit comprises grape, cucumber, pumpkin, watermelon, melon, potato, tomato, eggplant, green pepper, strawberry, okra, string bean, broad bean, pea, soybean, com, citrus, almond, walnut, apple, green soybean, Chinese cabbage, greens to be pickled, pakchoi, cabbage, cauliflower, broccoli, Brussels sprouts, onion, Welsh onion, garlic, shallot, leek, asparagus, lettuce, leaf lettuce, celery, spinach, garland chrysanthemum, parsley, wild chervil, Japanese parsley, udo, Japanese ginger, butterbur or beef-steak plant, radish, turnip, burdock, carrot, taro, sweet potato, yam, ginger or lotus root.

6. A method to increase water retention in a plant and/or fruit comprising applying the composition of claim 1.

7. The method of claim 6, wherein said plant and/or fruit comprises grape, cucumber, pumpkin, watermelon, melon, potato, tomato, eggplant, green pepper, strawberry, okra, string bean, broad bean, pea, soybean, com, citrus, almond, walnut, apple, green soybean, Chinese cabbage, greens to be pickled, pakchoi, cabbage, cauliflower, broccoli, Brussels sprouts, onion, Welsh onion, garlic, shallot, leek, asparagus, lettuce, leaf lettuce, celery, spinach, garland chrysanthemum, parsley, wild chervil, Japanese parsley, udo, Japanese ginger, butterbur or beef-steak plant, radish, turnip, burdock, carrot, potato, taro, sweet potato, yam, ginger or lotus root.

8. The composition of claim 1, further comprising about 77.8% of water, wherein the percentage of water is based on the total weight of composition.

9. The composition of claim 1, further comprising at least one of a fertilizer, an insecticide, and a fungicide.

10. A composition comprising consisting essentially of:
    about 10% of a mono-alcohol having 12 to 24 carbon atoms,
    about 0.1% of silicone,
    about 5% of an emulsifier,
    about 5% of propylene glycol,
    about 0.5% of potassium sorbate,
    about 0.5% of sodium benzoate,
    about 0.1% of xanthan gum, and
    about 1% of sodium lignosulphonate,
    wherein the percentages above are based on the total weight of composition.

11. The composition of claim 10, further comprising a sun blocking reagent.

12. The composition of claim 10, wherein the mono-alcohol has 13, 14, 15, 16, 17, 18, 19, 20, 21, 22, 23, or 24 carbon atoms.

13. A method to reduce sun burn effects on a plant and/or fruit comprising applying the composition of claim 10.

14. The method of claim 13, wherein said plant and/or fruit comprises grape, cucumber, pumpkin, watermelon, melon, potato, tomato, eggplant, green pepper, strawberry, okra, string bean, broad bean, pea, soybean, com, citrus, almond, walnut, apple, green soybean, Chinese cabbage, greens to be pickled, pakchoi, cabbage, cauliflower, broccoli, Brussels sprouts, onion, Welsh onion, garlic, shallot, leek, asparagus, lettuce, leaf lettuce, celery, spinach, garland chrysanthemum, parsley, wild chervil, Japanese parsley, udo, Japanese ginger, butterbur or beef-steak plant, radish, turnip, burdock, carrot, taro, sweet potato, yam, ginger or lotus root.

15. A method to increase water retention in a plant and/or fruit comprising applying the composition of claim 10.

16. The method of claim 15, wherein said plant and/or fruit comprises grape, cucumber, pumpkin, watermelon, melon, potato, tomato, eggplant, green pepper, strawberry, okra, string bean, broad bean, pea, soybean, com, citrus, almond, walnut, apple, green soybean, Chinese cabbage, greens to be pickled, pakchoi, cabbage, cauliflower, broccoli, Brussels sprouts, onion, Welsh onion, garlic, shallot, leek, asparagus, lettuce, leaf lettuce, celery, spinach, garland chrysanthemum, parsley, wild chervil, Japanese parsley, udo, Japanese ginger, butterbur or beef-steak plant, radish, turnip, burdock, carrot, potato, taro, sweet potato, yam, ginger or lotus root.

17. The composition of claim 10, further comprising about 77.8% of water, wherein the percentage of water is based on the total weight of composition.

18. The composition of claim 10, further comprising a fertilizer, an insecticide, a fungicide, or a combination thereof.

* * * * *